United States Patent [19]
Tanaka

[11] Patent Number: 5,250,977
[45] Date of Patent: Oct. 5, 1993

[54] ELECTRONIC FLASH UNIT

[75] Inventor: Kazuo Tanaka, Neyagawa, Japan

[73] Assignee: West Electric Co., Ltd., Osaka, Japan

[21] Appl. No.: 944,122

[22] Filed: Sep. 11, 1992

[30] Foreign Application Priority Data

Sep. 19, 1991 [JP] Japan .................. 3-239456

[51] Int. Cl.$^5$ .................. G03B 15/05; H05B 41/14
[52] U.S. Cl. .................. 354/413; 354/416;
354/145.1; 315/241 P
[58] Field of Search .................. 354/416, 145.1, 413,
354/417; 315/241 P, 241 S

[56] References Cited

U.S. PATENT DOCUMENTS

| | | | |
|---|---|---|---|
| 4,309,092 | 1/1982 | Kitagawa | 354/416 |
| 4,717,861 | 1/1988 | Yuasa et al. | 354/145.1 X |
| 4,839,686 | 6/1989 | Hosomizu et al. | 354/416 |
| 5,075,714 | 12/1991 | Hagiuda et al. | 354/416 |
| 5,159,381 | 10/1992 | Harrison | 354/416 |
| 5,180,953 | 1/1993 | Hirata et al. | 354/413 X |
| 5,187,410 | 2/1993 | Shimizu et al. | 315/241 P |

Primary Examiner—Russell E. Adams
Assistant Examiner—Jae N. Noh
Attorney, Agent, or Firm—Stevens, Davis, Miller & Mosher

[57] ABSTRACT

An electronic flash unit being effective in emitting light repeatedly at high speed by boosting an applying voltage between main electrodes of a flash discharge tube twice or more as much as a charged voltage in a main capacitor connected parallel to a high voltage DC power source, wherein the electronic flash device has a plurality of boosting capacitors connected with the flash discharge tube through plural second control switches respectively and a common circuit including an insulated gate bipolar transistor IGBT, the main capacitor and a first control switch for selective excitations, and also connected with a primary winding of a trigger transformer via a trigger capacitor, a diode and so on for charges during being un-excited, and wherein the electronic flash device has a switch control device for selectively turning on one of the plural second switches and for simultaneously turning on the first switch so as to supply a high voltage to the flash discharge tube being combined with the charged voltages of the boosting capacitors and the main capacitor after second et seq light emission operations.

2 Claims, 2 Drawing Sheets

ELECTRONIC FLASH UNIT

BACKGROUND OF THE INVENTION

1. Field of the Invention

The present invention relates to an electronic flash or strobe light unit having an insulated gate bipolar transistor (hereinafter referred to as IGBT for short) connected in series with a flash discharge tube so as to control the light emitting operation of the flash discharge tube, and more particularly to an electronic flash unit characterized by a voltage supply system for the flash discharge tube, which is effective in emitting light repeatedly at high speed.

2. Description of the Prior Art

A previously known electronic flash unit provided with an IGBT is disclosed in U.S. Pat. No. 4,839,686.

This conventional unit or apparatus has a circuit configuration as shown in FIG. 2. Specifically, it is composed of a high voltage DC power source 1 which is a well known DC-DC converter, a main capacitor 2 which is charged by the power source 1, a voltage regulating circuit 3 which is attached to the power source 1 and serves to supply a constant voltage to a light emission control circuit 7 described later, a known trigger circuit 4 for triggering a flash discharge tube 5, a control circuit 6 which is connected with a control means 8 within a camera body to transfer several kinds of signals and serves to produce several kinds of output signals such as a trigger signal for operating the trigger circuit 4, a light emission control circuit 7 for on-off controlling the IGBT connected in series with the flash discharge tube 5 to control the light emission from the flash discharge tube 5, and a double voltage circuit 9 for applying a voltage twice as high as a charging voltage to the main capacitor 2.

In operation, when switch Sw is turned on, the high voltage DC power source 1 operates. Then, the main capacitor 2 and a double voltage capacitor 9a are charged to have their polarity as shown by the high voltage outputted from the high voltage DC power source 1. Further, when switch Sw is turned on, a capacitor Ce which serves as a power supply for the control circuit 6 is charged by a low voltage power source E. Then, a capacitor 3a in the voltage regulating circuit 3 is also charged. Thus, the control circuit 6 starts to operate so that the light emission control circuit 7 enters a flash or light emission stand-by state.

In a state where the above respective capacitors have been charged, when the control means 8 in the camera body supplies a light emission starting signal to the control circuit 6, the control circuit 6 operates to produce a high level signal from its output terminal Oa, thereby turning on transistors Qa and Qb within the light emission control circuit 7.

When the transistors Qa and Qb turn on, the IGBT is turned on by the charged voltage in the capacitor 3a so that the trigger circuit 4 also operates. As a result, the flash discharge tube 5 consumes the charges stored in the main capacitor 2 to emit light On the way of the above light emission, when the control means 8 supplies a light emission stopping signal to the control circuit 6, the control circuit 6 produces a high level signal from its output terminal Ob thereby to turn on transistors Qc and Qd in the light emission control circuit 7. Thus, the transistors Qa, Qb and IGBT which have been "on" turn off. As a result, the flash discharge tube 5 stops emitting light.

The operation as described above is the basic operation of the conventional electronic flash unit of FIG. 2.

The electronic flash unit provided with an IGBT as shown in Fig. 2 does not produce excessive light emission unlike another conventional flash unit which stops emitting light using a commutation capacitor, can perform the repetitive light emission at high speed and can also be miniaturized in its shape.

However, as a result of detailed examination of the high speed repetitive light emission operation, it was found that the following problem remains unsolved.

If the repetitive light emission operation for the electronic flash unit constructed as shown in FIG. 2 is performed at the cycle (e.g. a certain cycle band of several tens of Hz or more) higher than a predetermined cycle, the subsequent light emission will occur before the double voltage capacitor 9a is charged sufficiently. In this case, since the double voltage circuit 9 does not perform its essential operation, the flash discharge tube 5 cannot emit light. As a result, missing of the light emission will occur disadvantageously.

Specifically, the double voltage capacitor 9a will not be charged while the cathode potential of the flash discharge tube 5 is in a high level, but starts to be charged only when the potential becomes a low level.

It is well known that when the flash discharge tube 5 once emits light, even if energy supply therefor is stopped, the above cathode potential remains in a high level during the period from completion of the ionized state to restoration to the initial state. In addition, the double voltage capacitor 9a has a suitable charging time constant. For this reason, if the subsequent light emitting operation is performed during the above period or at a time when the above time constant does not still pass although the above period has passed, the double voltage capacitor 9a will not be charged sufficiently. The double voltage circuit 9 cannot therefore perform its essential operation.

Incidentally, with a very high cycle exceeding the above cycle, the subsequent light emitting operation will be executed in a state where the flash discharge tube 5 can emit light without being triggered. So the flash discharge tube 5 can emit light very easily, and thus missing of light emission does not occur. This is well known.

On the other hand, in order to miniaturize the flash discharge tube and increase the amount of light emission therefrom, the technique of increasing the inside gas pressure to give the discharge tube a high impedance was proposed. But, as well known, this technique increases the discharge starting voltage of the discharge tube. In addition, considering the high speed repeating light emission, the tendency of increasing the light emission starting voltage becomes further pronounced since the above miniaturization deteriorates the heat dissipation characteristic and the high impedance boosts the heat storage characteristic. Thus, the above malfunction of the double voltage circuit becomes more disadvantageous for the light emission from the flash discharge tube.

SUMMARY OF THE INVENTION

An object of the present invention is to provide an electronic flash unit provided with an IGBT which can prevent missing of light emission in a high speed repetitive light emission operation at several tens of Hz or more and can surely perform the subsequent light emission operation.

Another object of the present invention is to provide an electronic flash unit equipped with an IGBT which comprises plural voltage boosting means which operate individually in response to a light emission starting signal supplied, and during the light emission operation by the operation of one voltage boosting means, charges voltage boosting capacitors of the remaining voltage boosting means which do not operate to a boosted voltage higher than their previously charged voltage using the voltage induced in a trigger transformer so that the high voltage can be applied between the main electrodes of the flash discharge tube in the subsequent light emission operation, namely can boost the voltage between the main electrodes of the flash discharge tube to about twice as large as the charged voltage in the main capacitor in an initial light emission operation, and more than twice in the succeeding light emission operations.

A further object of the present invention is to provide an electronic flash unit which can adopt a miniaturized high-impedance flash discharge tube because of prevention of missing of light emission.

Other objects and features of the present invention will be more apparent from the following description taken in conjunction with the accompanying drawings.

DESCRIPTION OF THE PREFERRED EMBODIMENTS

Figure 1:
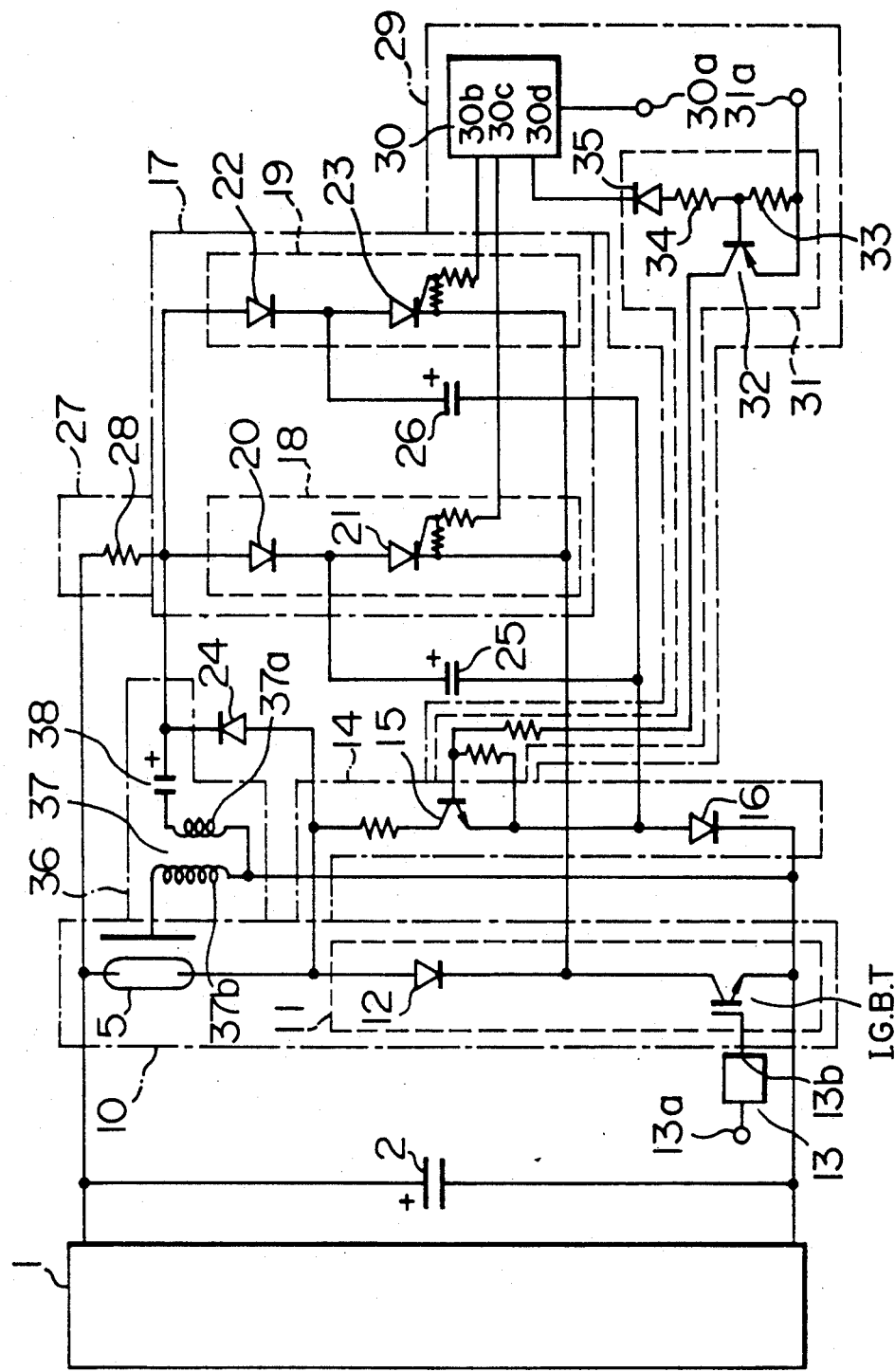
FIG. 1 is a circuit diagram showing one embodiment of a flash unit according to the present invention.

FIG. 1 is a circuit diagram showing one embodiment of an electronic flash unit according to the present invention. In FIG. 1, like reference symbols refer to like parts in FIG. 2.

A main capacitor 2 is connected across a high voltage DC power source 1 which is a known DC—DC converter circuit or laminated power source.

A seriate combination 11 is formed with a first diode 12 and an IGBT connceted in series with each other. A first series member 10 composed of the seriate combination 11 and a flash discharge tube 5 connected in series with each other is connected between two end terminals of the main capaitor 2.

The gate of the IGBT is connected with the output terminal 13b of the a driving control circuit 13 for on-off controlling the IGBT. The input terminal 13a of the driving control circuit 13 is supplied with a light emission stopping signal, for example.

The driving control circuit 13 may be a circuit providing a control system which turns on the IGBT in response to the operation of the high voltage DC power source 1 and turns it off in response to receiving the light emission stopping signal. The driving control circuit 13 may also be a circuit providing a control system which turns on the IGBT in response to a light emission starting signal, i.e. only during a light emission operation and turns it off in response to receiving the light emission stopping signal.

A second series member 14 is connected between both end terminals of the seriate combination 11. The second series member 14 is composed of a resistor with no reference number, a transistor 15 functioning as a first control switching element and having a control terminal, and a second diode 16; these elements are connected in series.

A parallel member 17 is connected between both terminals of the first diode 12 through a fourth diode 24. The parallel member 17 is formed with a parallel connection of plural seriate combinations 18 and 19 which include third diodes 20, 22 and SCRs 21, 23 functioning as second switching elements and having control terminals connected in series with each other, respectively. The parallel member 17 may be formed with more than two seriate combinations. The anode of the fourth diode 24 is connected with the anode of the first diode 12.

Between the anode of the second diode 16 and the cathode of each of the plural third diodes 20 and 22, plural voltage boosting capacitors 25 and 26 are respectively connected.

A resistor 28 serves as a charging means 27 for charging the plural voltage boosting capacitors 25 and 26 through the third diodes 20, 22 and the second diode 16.

A switch control means 29 is composed of a light emission control means 30 and a driving circuit 31.

The light emission control means 30, in response to the light emission starting signal supplied to its input terminal 30a, produces output signals for selecting one from the SCRs 21 and 23 to be turned on from its output terminals 30b and 30c individually, and produces an output signal for controlling the operation of the driving circuit 31 from its output terminal 30d.

The driving circuit 31 is composed of a transistor 32, resistors 33, 34 and a diode 35, and has a input terminal 31a supplied with an appropriate driving voltage. The driving circuit 31, in response to the output signal supplied from the light emission control means 30, supplies the appropriate driving voltage to the transistor 15 for turning on the transistor 15.

A trigger circuit 36 is composed of a trigger transformer 37 and a trigger capacitor 38, and operates to excite the flash discharge tube 5. A series member composed of a primary winding 37a of the trigger transformer 37 and the trigger capacitor 38 and forming a part of the trigger circuit 36 is connected between both ends of the parallel member 17 through the IGBT.

A detailed explanation will be given of the operation of one embodiment of the flash unit according to the present invention as shown in FIG. 1.

It is assumed that the driving control circuit 13 adopts the former system of the two control systems described above.

In operation, when an operation of e.g. closing an appropriate power switch not shown is made, the high voltage power DC source 1 starts a known operation. Then, the DC high voltage produced from the output terminals of the high voltage DC power source 1 charges the main capacitor 2 with a polarity as shown in the figure. In response to start of the operation of the high voltage DC power source, the driving control circuit 13 is placed in its operating state.

The driving control circuit 13 produces from its output terminal 13b a turn-on voltage for the IGBT to place the IGBT in a conduction stand-by state.

Simultaneously, the voltage boosting capacitors 25, 26 and the trigger capacitor 38 are charged to have polarities as shown. Namely, they are charged so that the terminals connected to the cathode of the flash discharge tube 5 through the third diodes 20, 22 and the fourth diode 24 may have higher potentials.

The voltage boosting capacitors 25 and 26 are charged through the charging resistor 28 serving as the charging means 27, the third diodes 20, 22 and the second diode 16. On the other hand, the trigger capacitor 38 is charged by means of the charging resistor 28 and the trigger transformer 37. Incidentally, it is needless to say that the charged voltage of the capacitor is approximately equal to the charged voltage in the main capacitor 2.

After the main capacitor 2 and other capacitors having been charged, when an initial light emission starting signal is supplied to the input terminal 30a of the light emission control means 30 in the switch control means 29, the light emission control means 30 operates. The light emission control means 30 may produce a turn-on voltage for SCR 23 from its output terminal 30b to the gate of SCR 23, and a low level output signal from its output terminal 30d for turning on the transistor 32 in the driving circuit 31, for example. Then, the remaining output terminal 30c of the light emission control means 30 is maintained at a low level. In short, in this case, the light emission control means 30 selects SCR 23 out of the plural second control switch elements, SCRs 21 and 23, in response to the supplied light emission starting signal.

Thus, since the IGBT has been placed in the conduction stand-by state by the operation of the driving control circuit 13, the SCR 23 turns on at a timing when the above turn-on voltage is supplied. At the same time, the transistor 32 in the driving circuit 31 also turns on to supply the appropriate driving voltage supplied to the input terminal 31a to the base of the transistor 15. Thus, the transistor 15 also turns on.

When the transistor 15 and the SCR 23 turn on, the charge stored in the trigger capacitor 38 is discharged through the third diode 22, the SCR 23, the IGBT and the primary winding 37a of the trigger transformer 37. As a result, the high voltage induced in the secondary winding of the trigger transformer 37 excites the flash discharge tube 5.

At the same time, the charge stored in the voltage boosting capacitor 26 is discharged through the SCR 23, the IGBT, the main capacitor 2 and the transistor 15. Thus, the voltage resulting from superposition of the voltages charged in the main capacitor 2 and the voltage boosting capacitor 26 will be applied between the main electrodes of the flash discharge tube 5.

As described above, the charged voltage in the voltage boosting capacitor 26 is approximately equal to that in the main capacitor 2 so that the voltage applied between the main electrodes of the flash discharge tube 5 is about twice as large as the charged voltage in the main capacitor 2. For this reason, the flash discharge tube 5 starts light emission easily. Namely, from when the SCR 23 turns on, the flash discharge tube 5 consumes the charge stored in the main capacitor 2 to emit light.

Then, an oscillating voltage has been induced in the primary winding 37a of the trigger transformer 37. The primary winding 37a with the trigger capacitor 38 are connected between both ends of the parallel member 17 through the IGBT, and the SCR 21 which is a part of the parallel member 17 is in the off-state since it has not been selected for the present light emission operation. The oscillating voltage is therefore applied to the voltage boosting capacitor 25, which is connected with the SCR 21 and did not contribute to the light emission, through the trigger capacitor 38, the third diode 20, the second diode 16 and the IGBT.

As a result, the voltage boosting capacitor 25, since the oscillating voltage is higher than the charged voltage in the main capacitor 2, is charged to the boosted voltage higher than the voltage approximately equal to the charged voltage in the main capacitor 2 which has been charged in the capacitor 25 through the charging means 27. The voltage boosting capacitor 26 which has contributed to the light emission, will not be charged to the boosted voltage by the oscillating voltage since the SCR 23 is in the conduction state.

In a state where the flash discharge tube 5 emits light, when a light emission stopping signal is supplied to the input terminal 13a of the driving control circuit 13, the driving control circuit 13 turns off the IGBT.

When the IGBT turns off, the discharge current flowing through the flash discharge tube 5 is interrupted. Thus, the flash discharge tube 5 stops emitting light and returns to the initial state through an ionized state as described previously.

At the same time, the discharge loop of the voltage boosting capacitor 26 through the SCR 23, IGBT and transistor 15 and that of the trigger capacitor 38 through the third diode 22, SCR 23, second diode 16 and IGBT are interrupted. Thus, the voltage boosting capacitor 26 and the trigger capacitor 38 are placed in a chargeable state.

As a result, a current flows through the loop composed of the main capacitor 2, flash discharge tube 5, fourth diode 24, third diode 22, voltage boosting capacitor 26 and second diode 16 and a current flows through the loop composed of the main capacitor 2, flash discharge tube 5, fourth diode 24, trigger capacitor 38, and trigger transformer 37. The voltage boosting capacitor 26 and the trigger capacitor 38 are therefore charged instantaneously.

The voltage boosting capacitor 26 and the trigger capacitor 38 are charged so that the terminals connected with the cathode of the flash discharge tube 5 are at a higher potential. Therefore, the charging operation for the voltage boosting capacitor 26 and trigger capacitor 38 is not influenced by the higher potential at the cathode of the flash discharge tube 5 when the flash discharge tube 5 is placed in the ionized state. The charging operation is therefore started without any trouble when the IGBT turns off. In other words, the charging operation for the voltage boosting capacitor 26 and the trigger capacitor 38 is started instantaneously when the IGBT turns off.

During such a charging operation by means of the flash discharge tube 5 in the ionized state, the voltage boosting operation capacitor 25 which did not contribute to the light emission described above does not make any electrical operation due to the function of the third diode 20. The voltage boosting capacitor 25 is maintained in the state charged to the higher voltage than the charged voltage in the main capacitor 2.

When the subsequent light emission starting signal is supplied for the subsequent light emission operation, the light emission control means 30 operates to produce from its output terminal 30c a turn-on voltage for the SCR 21 as the second control switch element different from that in the previous light emission operation. The light emission control means 30 produces also, from its output terminal 30d, an output signal for driving the driving circuit 31 which is the same as in the previous light emission operation.

Now the SCR 21 is selected instead of the SCR 23 selected in the previous light emission operation. Thus, the SCR 21 and transistor 15 turn on. Then, if the IGBT is in the on-state, the charged voltage in the voltage capacitor 25 connected with the selected SCR 21 is applied between the main electrodes of the flash discharge tube 5 through the above SCR 21, IGBT, transistor 15, etc. The trigger circuit 36 operates simultaneously.

It should be now noted that as described above, during the previous light emission operation, the trigger circuit 36 charges the voltage boosting capacitor 25 to the voltage higher than the charged voltage in the main capacitor 2 which is the charged voltage in the capacitor 25 by means of the charging means 27. In this case, therefore, the voltage between the main electrodes of the flash discharge tube 5 can be controlled to the high voltage twice or more as large as the charged voltage in the main capacitor 2. Thus, the flash discharge tube 5 starts the light emission operation more easily than the previous light emission operation so that it consumes the charge stored in the main capacitor 2 to emit light.

During such a light emission operation of the flash discharge tube 5, as in the previous light emission operation, the oscillating voltage induced in the primary winding 37a during the operation of the trigger circuit 36 is applied, through the trigger capacitor 38 and second diode 16, to the voltage boosting capacitor 26 which is connected with the SCR 23 not selected for the present light emission operation and contributed to the previous light emission operation.

As a result, the voltage boosting capacitor 26 which does not contribute to the present light emission operation is charged to the boosted voltage which is higher than the charged voltage developed through the flash discharge tube 5 in the ionized state when the previous light emission operation has completed.

Incidentally, when the IGBT turns off by the operation of the driving control circuit 13, as in the previous light emission operation, the flash discharge tube is placed in an ionized state, and the voltage boosting capacitor 25 contributed to the present light emission operation and trigger capacitor 38 are placed in a chargeable state. Thus, both the capacitors 25 and 38 are charged instantaneously through the flash discharge tube 5 when the IGBT turns off. Incidentally, as in the previous light emission operation, the voltage boosting capacitor 26 which does not contribute to the present light emission operation makes no electrical operation.

Thus, the above operation will be repeated whenever the SCR 23 or SCR 21 is selected so that they turn on successively.

Specifically, in the electronic flash unit according to the present invention, when the light emission operation is made, the voltage boosting capacitor which does not contribute to the present light emission is charged to the high voltage induced in the primary winding of the trigger transformer during the light emission. As a result, during the subsequent light emission operation, that voltage boosting capacitor permits the high voltage to be applied between the main electrodes of the flash discharge tube; the high voltage is twice or more as large as the charged voltage in the main capacitor.

In other words, the electronic flash unit according to the present invention can always apply a high voltage twice or more as large as the charged voltage in the main capacitor between the main electrodes of the flash discharge tube in the second et seq light emission operation. This permits the light emission operation at the high repeated cycle of several tens of Hz to be surely realized without any missing of light emission.

Figure 2:
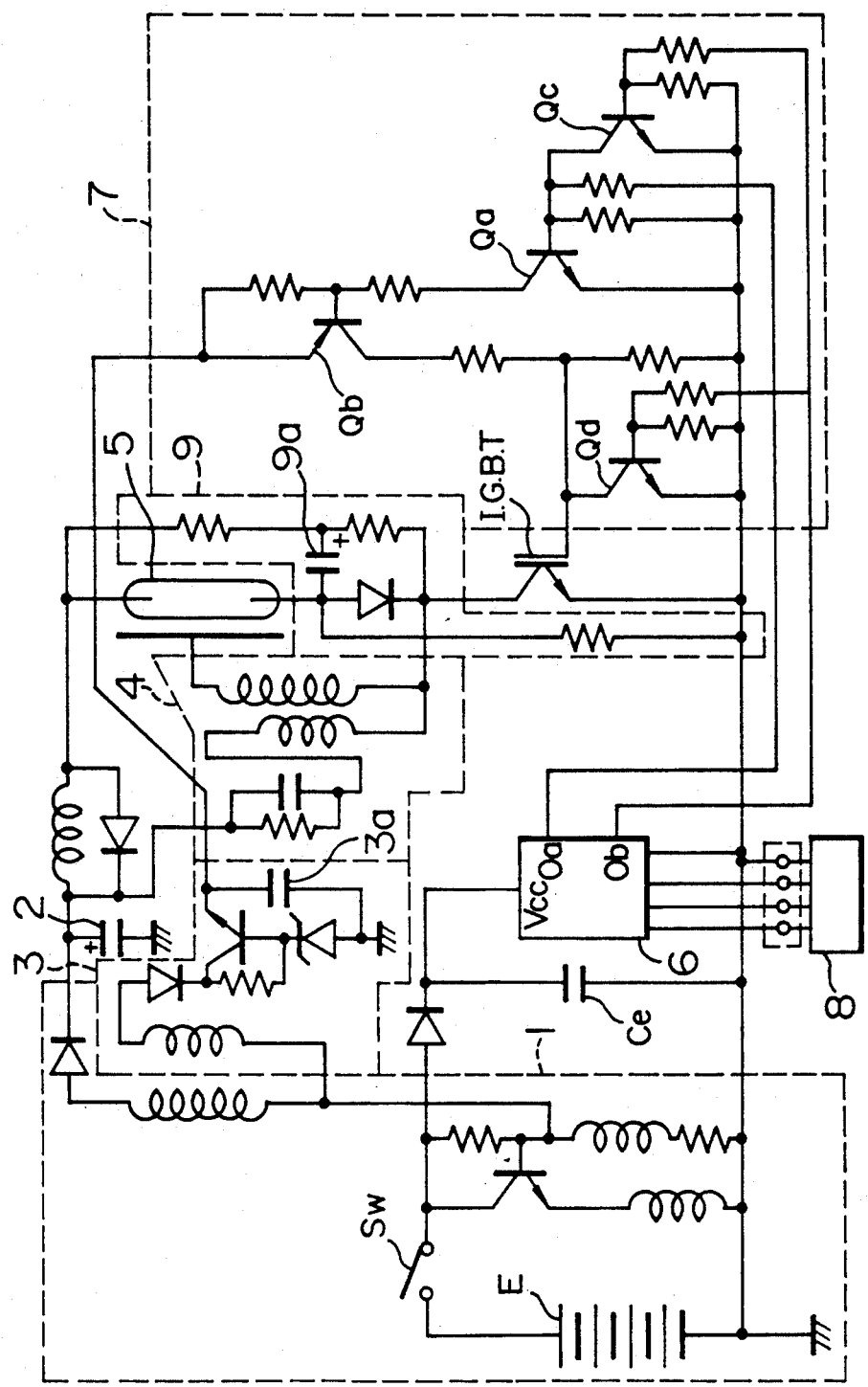
FIG. 2 is a circuit diagram showing an exemplary electronic flash unit of a prior art as disclosed in U.S. Pat. No. 4,839,686.

The driving control circuit 13 of the electronic flash unit according to the present invention may adopt the system of the conventional device as shown in FIG. 2 which usually controls the IGBT so as to be in an off-state and operates only in a light emission operation to produce an turn-on voltage for the IGBT. However, where the driving control circuit of the above system is adopted, it is desired from the viewpoint of prevention of breakdown of the IGBT that the SCRs 21, 23 or transistor 15 is turned on in a state where the IGBT is in a sufficient conduction state. In actual use, it is preferable that the output timing of the turn-on voltage for the IGBT precedes those for the above SCR 21, etc.

As described above, when the light emission operation is made, the electronic flash unit according to the present invention charges the voltage boosting capacitor which does not contribute to the present light emission of plural voltage boosting capacitor to the high voltage induced in the primary winding of the trigger transformer during the light emission. Further, in the subsequent light emission operation, the electronic flash unit according to the present invention applies the high voltage superposed on the charged voltage in the main capacitor between the main electrodes of the flash discharge tube. As a result, the electronic flash unit according to the present invention can always apply a high voltage twice or more as large as the charged voltage in the main capacitor between the main electrodes of the flash discharge tube in the second et seq light emission operation.

This permits the light emission operation at the high repeating cycle of several tens of Hz to be surely realized without any missing of light emission, namely permits the flash discharge tube to emit light so as to follow the on-off operation of an IGBT at a high repeating cycle.

I claim:

1. An electronic flash unit comprising:
   a high voltage DC power source having two terminals;
   a main capacitor having two terminals connected between the two terminals of said high voltage DC power source and charged by power supply therefrom;
   a first series member composed of a flash discharge tube and a seriate combination including a first diode having an anode and a cathode and an insulated gate bipolar transistor (IGBT) having a control terminal connected in series to said cathode, said first series member connected between the two terminals of said main capacitor;
   a second-series member composed of a first control switch element having a control terminal and a second diode having an anode and a cathode, said anode being connected to said first control switch element, said second series member connected between two ends of said seriate combination;
   a parallel member composed of plural series members connected in parallel, each of said series members being composed of a third diode having an anode and a cathode and a second control switch element having a control terminal, said parallel member connected between two ends of said first diode through a fourth diode having an anode connected with the anode of said first diode;

a plurality of voltage boosting capacitors each connected between the anode of said second diode and the cathode of each said third diode;

charging means for charging said plurality of voltage boosting capacitors through said third diodes and said second diode;

switch control means, in response to a supplied light emission starting signal, for operating said first control switch and also selecting one of said plural second control switch elements to operate individually;

driving control circuit connected to said control terminal of said IGBT for controlling a turn-on voltage to be supplied to the control terminal of said IGBT so as to control an on/off state of said IGBT; and a trigger circuit having a third series member composed of a trigger capacitor and a primary winding of a trigger transformer, said third series member connected between two ends of said parallel member through said IGBT, said trigger circuit operating to excite said flash discharge tube.

2. An electronic flash unit according to claim 1, wherein said switch control means comprises:

light emission control means composed of an input terminal for receiving a light emission starting signal, first output terminals for outputting a first output signal for selectively operating said second control switch elements in response to said light emission starting signal, and a second output terminal for outputting a second output signal for operating said first control switch element in response to said light emission starting signal; and a driving circuit having an input terminal receiving a driving voltage, said driving circuit, in response to said second output signal, supplying said driving voltage to said first control switch element to turn on.

* * * * *